US007813292B2

(12) United States Patent
Reinhold

(10) Patent No.: US 7,813,292 B2
(45) Date of Patent: Oct. 12, 2010

(54) COMMUNICATION PROTOCOL TESTING SYSTEM

(75) Inventor: Barry Reinhold, Lee, NH (US)

(73) Assignee: Lamprey Networks, Inc., Durham, NH (US)

( * ) Notice: Subject to any disclaimer, the term of this patent is extended or adjusted under 35 U.S.C. 154(b) by 792 days.

(21) Appl. No.: 11/194,911

(22) Filed: Aug. 1, 2005

(65) Prior Publication Data
US 2007/0025259 A1 Feb. 1, 2007

(51) Int. Cl.
*H04L 12/26* (2006.01)
(52) U.S. Cl. ...................................... 370/252
(58) Field of Classification Search ............... 370/394, 370/241, 242, 252, 389, 229
See application file for complete search history.

(56) References Cited

U.S. PATENT DOCUMENTS

| 6,449,214 | B1 * | 9/2002 | Carr et al. .................. 365/236 |
| 6,480,507 | B1 | 11/2002 | Mercer et al. |
| 6,560,723 | B1 | 5/2003 | Matsui |
| 2002/0065938 | A1 * | 5/2002 | Jungck et al. ............... 709/246 |
| 2003/0140193 | A1 * | 7/2003 | Acharya et al. ............. 711/112 |
| 2003/0156548 | A1 | 8/2003 | Sapp |
| 2004/0213237 | A1 * | 10/2004 | Yasue et al. ................. 370/392 |
| 2005/0060418 | A1 | 3/2005 | Sorokopud |
| 2005/0182929 | A1 * | 8/2005 | Kaniyar et al. ............. 713/164 |
| 2006/0259966 | A1 * | 11/2006 | Ilnicki ........................ 726/22 |

OTHER PUBLICATIONS

M. Barbeau and F. Bordeleau, "A Protocol Stack Development Tool Using Generative Programming," in: D. Batory and C. Consel (Eds.), Proceedings of Generative Programming and Component Engineering (GPCE), 2002, pp. 93-109.*
International Search Report and Written Opinion as issued in corresponding PCT patent application No. PCT/US06/29808.

* cited by examiner

*Primary Examiner*—Derrick W Ferris
*Assistant Examiner*—Omar Ghowrwal

(57) ABSTRACT

A method includes representing a communication endpoint as a protocol stack having a plurality of protocol software modules, each of the plurality of protocol software modules providing associated protocol services for a packet flowing through the protocol software module, and enabling a test application to access internal state information of the packet as the packet moves between the plurality of protocol software modules. A computer program product and system are also provided.

10 Claims, 6 Drawing Sheets

COMMUNICATION PROTOCOL TESTING SYSTEM

FIELD

This disclosure relates to testing systems and more particularly to communication protocol testing systems.

BACKGROUND

A communication protocol may exist at several levels in a communication system and may be defined as a set of rules that end points in the communication system utilize when they communicate. The set of rules for the communication protocol may be described in a particular standard. There are many different existing and developing communication protocols. It may be desirable to perform tests of such existing communication protocols and developing communication protocols at various phases during the development cycle of the communication protocol. Such tests may include conformance tests and system integration tests on a communication system utilizing the communication protocol.

Conventional tests may be designed for a particular communication protocol or communication system and may be focused on a particular problem to be tested. Hence, test developers must develop new tests for different communication protocols or communication systems. In addition, conventional test tools do not provide mechanisms to allow the protocol to define its testing interface. In this environment, detailed tests are either not done or done by manipulating the code of the communication protocol.

Conventional tests also have no control over the complex interactions that occur in a protocol stack. Thus, they cannot create the test condition necessary to test particular aspects of the communication protocol. For example, some communication protocols may parse data into smaller portions or packets for more efficient routing. Each packet may include a sequenced number from a counter in a header of the packet. The receiver may compare the sequenced number of the transmitted packet with an expected value to make sure a message is ordered. The counter may start counting at an initial count value and increment its count by one for each transferred packet and "wrap" back to its initial count value after the counter reaches its maximum count value. The counter may be as large as 64 bits in size for some newer communication protocols. A conventional test to test the wrap condition may start the counter at the initial count value and transfer sufficient packets so the counter will wrap back to its initial count value. This can take a considerable time especially with counters increasing in size. Therefore, testing such a "wrap condition" with a conventional testing system is likely not done or tested by requiring that developers modify the source code of the communication protocol to create the "wrap condition." Both situations are undesirable.

BRIEF DESCRIPTION OF THE DRAWINGS

Features and advantages of embodiments of the claimed subject matter will become apparent as the following Detailed Description proceeds, and upon reference to the Drawings, where like numerals depict like parts, and in which:

Although the following Detailed Description will proceed with reference being made to illustrative embodiments, many alternatives, modifications, and variations thereof will be apparent to those skilled in the art. Accordingly, it is intended that the claimed subject matter be viewed broadly.

DETAILED DESCRIPTION

Figure 1:
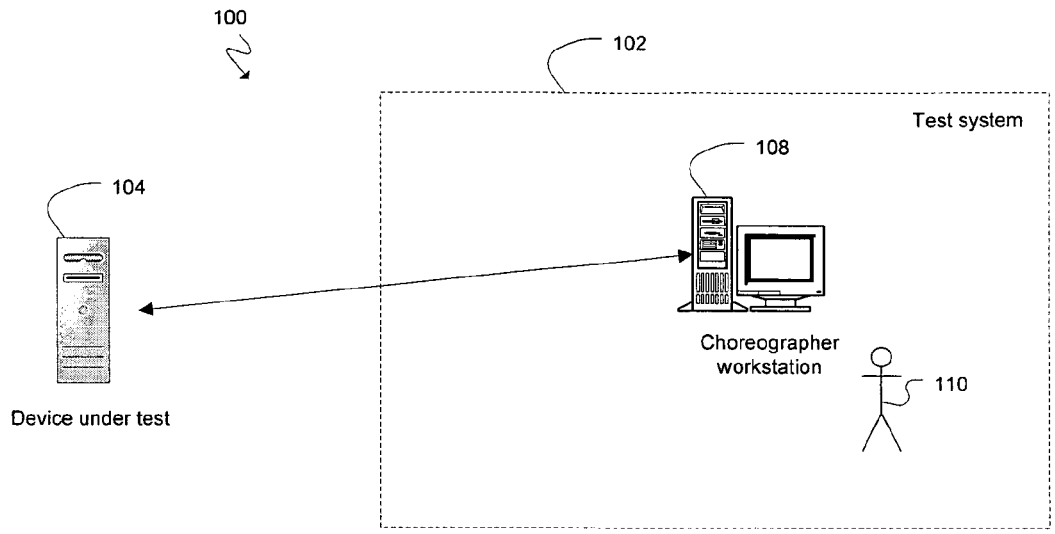
FIG. 1 is a block diagram of a testing system to test a device under test.

FIG. 1 illustrates a system 100 including a test system 102 to test a device under test 104. The test system may 102 include a choreographer workstation 108. The choreographer workstation 108 may be a computer that provides a central point of management for the test system 102. The choreographer workstation 108 may also provide a user interface system for a user 110 to interact with the choreographer workstation 108. The choreographer workstation 108 may also manage overall execution of test suites and discover and allocate test system 102 resources. The test system 102 may perform a variety of tests on differing communication protocols including, but not limited to, conformance tests and system integration tests. The results of the conformance test may ascertain if the communication protocol under test performed in conformance with one or more provisions of a detailed specification. The communication protocols may include, but not be limited to, network communication protocols and storage communication protocols. The test system 102 may include multiple computer systems and may be configured in a variety of fashions to perform differing types of tests and to simulate differing devices and conditions.

Figure 2:
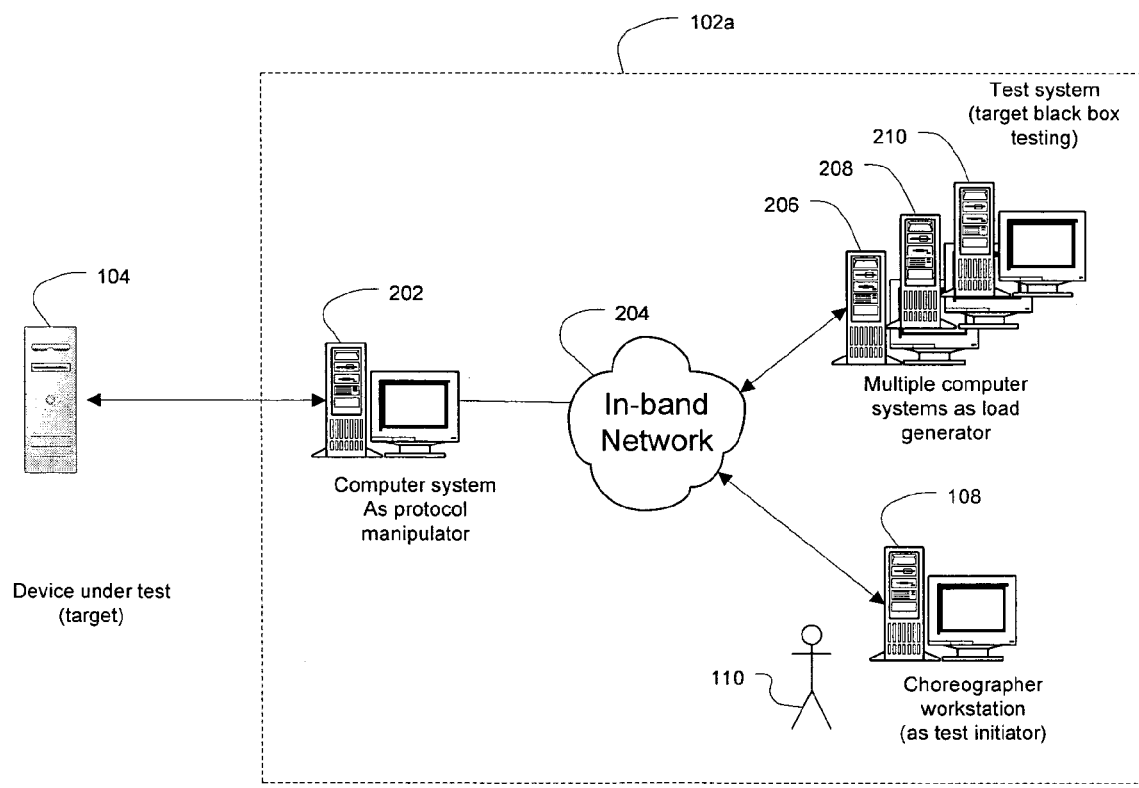
FIG. 2 is a block diagram of a target black box testing set up for the testing system of FIG. 1.

FIG. 2 illustrates a block diagram of an embodiment of a test system 102a consistent with the test system 102 of FIG. 1. The test system 102a may be set up for target black box testing of the device under test 104. The test system 102a may include a plurality of computer systems 206, 208, 210 that may act as a load generator. The test system 102a may also include the choreographer workstation 108 that provides a user interface for a test developer 110 to interface with the test system 102a and may act as the test initiator. The test system 102a may also include a computer system 202 acting as a protocol manipulator. The computer systems 206, 208, 210, 202 and the choreographer workstation 108 may communicate via an in-band network 204. The test system 102 may also be set up for other configurations (not illustrated) such an initiator black box testing, black box testing of a bridge, and white box testing. One computer system can represent thousands of logical targets or initiators.

Figure 3:
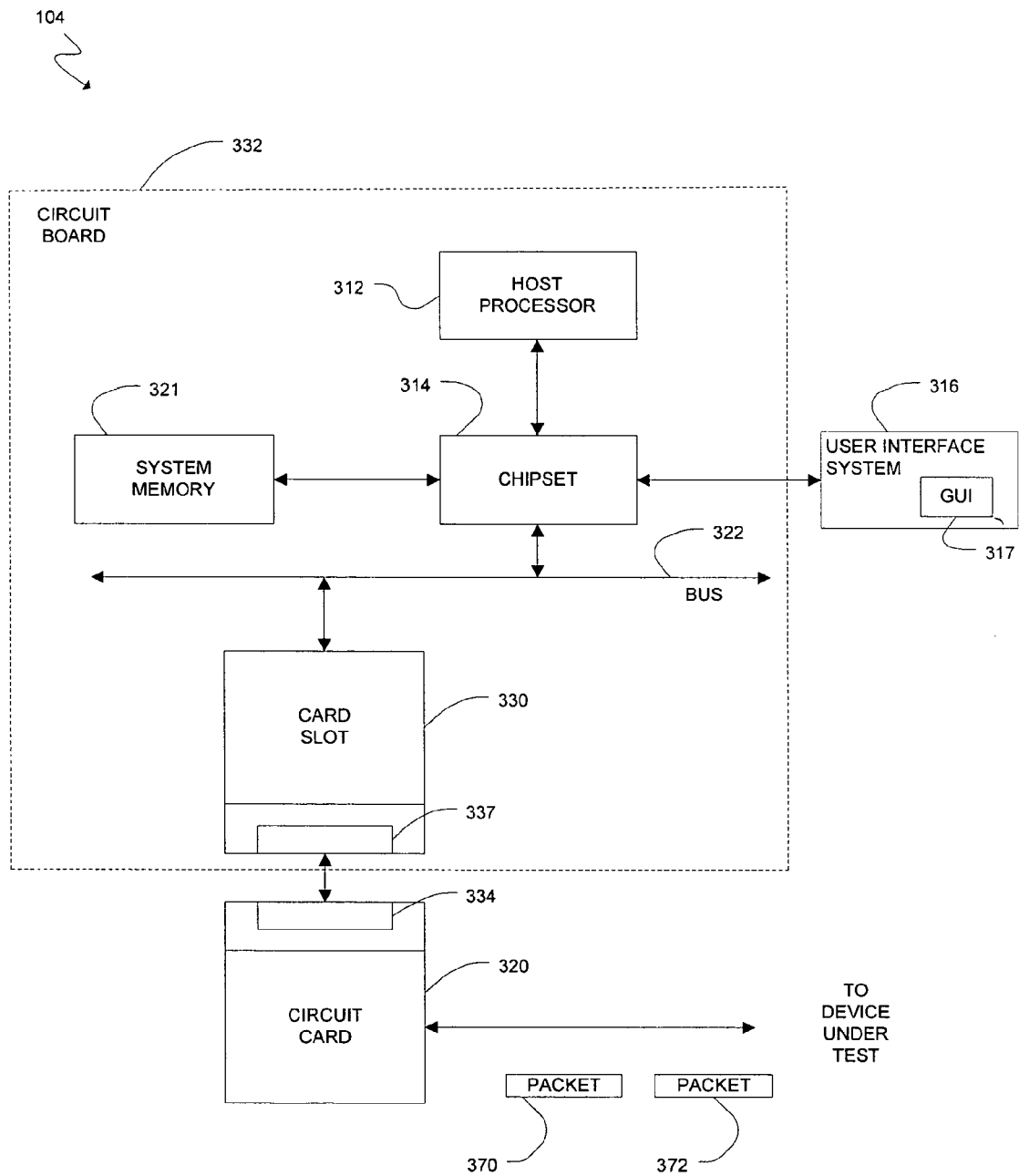
FIG. 3 is a block diagram of the choreographer workstation of FIG. 1.

FIG. 3 is a block diagram of some components of the choreographer workstation 108 of FIGS. 1 and 2. The choreographer workstation 108 may include a host processor 312, a bus 322, a user interface system 316, a chipset 314, system memory 321, a card slot 330 and a circuit card 320 capable of communicating with the device under test. The host processor 312 may include one or more processors known in the art such as an INTEL® PENTIUM ® IV brand processor commercially available from Intel Corporation. The bus 322 may include various bus types to transfer data and commands. The user interface system 316 may include one or more devices for a human user 110 to input commands and/or data and/or to monitor the test system 102 such as, for example, a keyboard, pointing device, and/or video display. The user interface system 316 may also include a graphic user interface (GUI) 317 to present a user with information to monitor and control tests of the test system 102.

The chipset 314 may include a host bridge/hub system (not shown) that couples the processor 312, system memory 321, and user interface system 316 to each other and to the bus 322. The chipset 314 may include one or more integrated circuit chips including, but not limited to, a graphics controller and an I/O controller hub chipset. System memory 321 may include one or more non-transitory computer readable storage media such as random-access memory (RAM), dynamic RAM (DRAM), static RAM (SRAM) magnetic disk (e.g., floppy disk and hard drive) memory, optical disk (e.g., CD-ROM) memory, and/or any other device that can store information. The processor 312, system memory 321, chipset 314, bus 322, and circuit card slot 330 may be on one circuit board 332 such as a system motherboard.

The circuit card 320 may be constructed to permit it to be inserted into the circuit card slot 330. When the circuit card 320 is properly inserted into the slot 330, connectors 334 and 337 become electrically and mechanically coupled to each other. When connectors 334 and 337 are so coupled to each other, the card 320 becomes electrically coupled to bus 322 and may exchange data and/or commands with system memory 321, host processor 312, and/or user interface system 316 via bus 322 and chipset 314. The circuit card 320 may communicate with the device under test via a plurality of packets 370, 372. Although only two packets 370, 372 are illustrated for clarity, a large number of packets may be transmitted and received by the circuit card 320. For networking application, the circuit card 320 may be referred to as a network interface card (NIC) and for storage applications the circuit card 320 may be referred to as a host bus adapter (HBA). Similarly, the device under test 104 may also include a circuit card and the other components illustrated in FIG. 3. Communication for the testing network between circuit cards of the test system 102 and the device under test 104 may take place via in band communication, while control communication may take place via out of band communication.

A computer program product consistent with an embodiment may be installed on the choreographer workstation 108 and/or other computer systems of the test system 102 and the device under test 104 to enable separation of test logic from implementation of the test. In this way, a test developer may utilize the test logic, e.g., of a test application, to perform similar tests for differing communication protocols thus reducing the effort, time, and expense to implement that test for a new communication protocol. The computer program product may reside on any variety of computer readable medium, e.g., system memory 321 in one embodiment, which, when executed by a processor, e.g., processor 312 in one embodiment, cause the processor to perform functions detailed herein.

Figure 4:
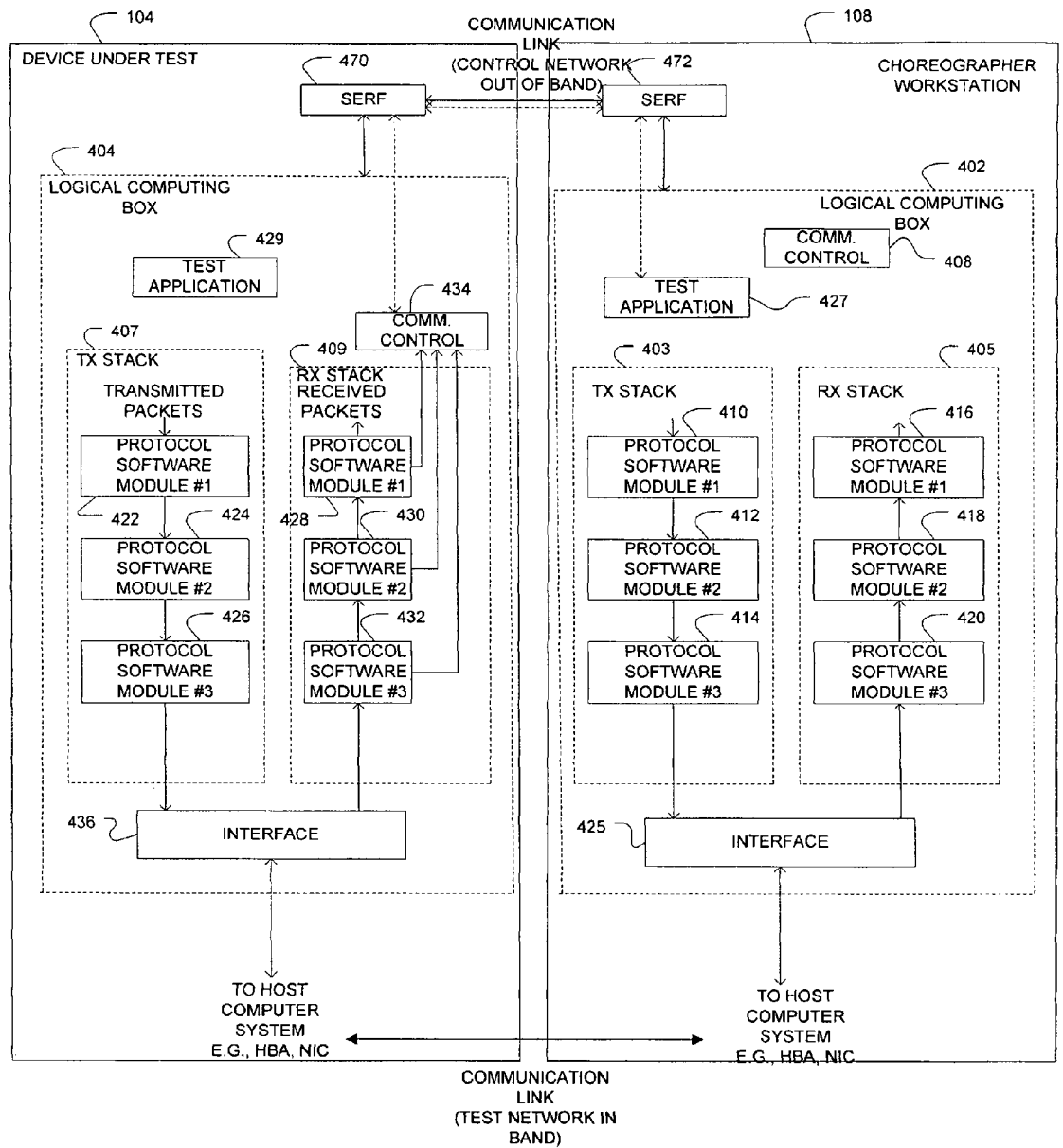
FIG. 4 is a block diagram of logical computing boxes of the choreographer workstation and device under test of FIG. 1.

FIG. 4 is a block diagram of the choreographer workstation 108 and the device under test 104. A logical computing box 402 may be created by a computer program consistent with an embodiment and may reside on the choreographer workstation 108. Another logical computing box 404 may be created by a computer program consistent with an embodiment and may reside on the device under test 104. Each logical computing box 402 and 404 may be a software construct that represents a communication endpoint such as the communication endpoints of the choreographer workstation 108 and the device under test 104. Although only one logical computing box 402 and 404 is illustrated as residing on computer systems 108 and 104 respectively, a plurality of logical computing boxes may reside on one computer system.

The logical computing box 402 of the choreographer workstation 108 may include a test application 427 that may be accessed by a user of the choreographer workstation via the user interface system 316. The choreographer workstation 108 and the device under test 104 may also each include a "serf" 470, 472. Each serf 470, 472 may be a software construct that may perform as a message and resource manager for their respective physical computer systems and may manage communication between both local and remote logical computing boxes. The term "serf" was chosen since it is tied to one or more logical computing boxes of one computer system. There may be one serf per computer system, e.g., the choreographer workstation 108 may have serf 472 and the device under test 104 may have serf 470. Each serf 470, 472 may also maintain persistent storage for test results and logs.

The logical computing box 402 may also include a communication control portion 408, a transmit stack 403, a receive stack 405, and an interface 425. The communication control portion 408 may manage communication within the addressable entities of the logical computing box 402 and between other logical computing boxes. The communication control portion 408 may provide an out of band communication path for control of testing activities. Each entity in the logical computing box 402 and other logical computing boxes may be able to communicate using out of band communication and may have a particular address to assist with such communication. Hence, communication between each serf 470, 472 may take place via a communication link out of band for controlling communications between logical computing boxes 402, 404.

Some addresses may include an address of a particular logical computing box, a virtual port identifier, and a test set identification (ID) value. The test set ID value may be an identifier that is utilized to limit the scope of communication such that messages are only exchanged between logical computing boxes that have the same test set ID value. The communication control portion 408 may therefore make the physical location of the logical computing box transparent to a user of the test application 427. That is, a test developer utilizing the test application 427 would not have to write different code to exchange out of band information between logical computing boxes that are local and reside on a given physical computer system or that reside on differing physical computer systems.

The transmit stack 403 may include a plurality of protocol software modules 410, 412, 414, while the receive stack 405 may also include a plurality of protocol software modules 416, 418, 420. Each protocol software module may contain protocol code of an associated communication protocol labeled generically as protocol numbers 1, 2, and 3. Although each protocol stack 403, 405 is illustrated as having three protocol software modules, each stack may contain any number of protocol software modules. Each protocol software module may include protocol code to provide associated protocol services for each communication protocol.

A list of communication protocols may include, but not be limited to, Small Computer System Interface (SCSI), Internet Small Computer System Interface (iSCSI), Transmission Control Protocol (TCP), Internet Protocol (IP), Ethernet, Fibre Channel (FC), Serial Advanced Technology Attachment (S-ATA), and Serial Attached Small Computer Systems Interface (SAS) protocol, and later developed communication protocols. The iSCSI protocol may comply with the protocol described in "IP Storage Working Group, Internet Draft, draft-itef-ips-iscsi-21.txt", published Apr. 29, 2004 by the Internet Engineering Task Force (IETF) and/or later published versions of the same. The FC protocol may comply with the interface/protocol described in ANSI Standard Fibre Channel Framing and Signaling Specification, 2 Rev 0.3 T11/1619-D, dated Sep. 7, 2004. The S-ATA protocol may comply with the protocol described in "Serial ATA: High Speed Serialized AT Attachment," Revision 1.0a, published on Jan. 7, 2003 by the Serial ATA Working Group, and the Extension to SATA, 1.0a Rev 1.2, dated Aug. 27, 2004. The SAS protocol may comply with the protocol described in "Information Technology—Serial Attached SCSI —1.1 (SAS)," Working Draft American National Standard of International Committee For Information Technology Standards (INCITS) T10 Technical Committee, Project T10/1562-D, Revision 6, published Oct. 2, 2004, by American National Standards Institute.

An interface 425 may link the lower protocol software module 414, 420 of each stack 403, 405 into the communication facilities of the host computer system. This communication facility may include the circuit card 320 functioning as a network interface card (NIC) for network communication protocols or a host bus adapter (HBA) for storage communication protocols. Similarly, the logical computing box 404 may include a communication control portion 434, a transmit stack 407, a receive stack 409, a test application 429, and an interface 436. The transmit stack 407 may include a plurality of protocol software modules 422, 424, 426, while the receive stack 409 may also include a plurality of protocol software modules 428, 430, 432.

Each protocol software module of the various transmit 403, 407 and receive stacks 405, 409 may be a message passing entity that passes packets between each module. Each protocol software module may also pass messages which include the exchange of information that often, but doesn't necessarily, include a packet. The information may be in a standardized form that allows protocol software modules to be chained together to form the respective stacks 403, 405, 407, 409 such that the output of one protocol software module may provide the input of another protocol software module. For example, the protocol software modules 428, 430, 432 may be chained together to form the receive stack 409 such that a packet output the third protocol software module 432 is input the second protocol software module 430 and the packet output the second software module 430 is input the first protocol software module 428.

When integrated into a protocol stack such as receive stack 409, each protocol software module may provide an initialization interface that is called by a startup code. The initialization interface may fill in standard function tables with addresses provided by the protocol software module to provide basic services including the address of the routine that is called if the protocol software module is to be "plumbed" into a stack. The term plumbed denotes that a software protocol module has been inserted into a protocol stack of protocol software modules such that it will properly receive and transmit packets flowing through the stack. Plumbing may be accomplished by inserting the address of where a lower layer of software is to deliver its packets such that the new layer will receive the flow of packets.

If a protocol software module is plumbed, it may provide a callable function that will accept messages delivered to it. It may also export a set of identifiers into a symbol table that defines functions, variables, and fields within the protocol software module. These identifiers may represent the information that the protocol layer module exports for testing. The test application 427 may utilize these identifiers in constructing expression to access internal state information of packets as packets move between the protocol software modules and to also manipulate fields in the packets.

Each protocol software module of the transmit 403, 407 and receive stacks 405, 409 may also provide associated protocol services for a packet flowing through each module. Such packets may be in band messages that flow from the output of one protocol software module to the input of another software module. Each protocol software module may also enable the test application 427 to access internal state information of each packet as each packet moves between each protocol software module. The internal state information may represent the view the protocol software module sees at the time it is processing a packet flowing through the protocol stack. This may enable test developers to perform state testing without modifying the actual protocol code in order to do state testing. In addition, each protocol software module may also enable the test application 427 to control and to modify internal state information in order to efficiently perform various tests.

For instance, the device under test 104 may act as a target and the choreographer workstation 108 may act as an initiator to test aspects of one or more storage communication protocols. As shown in phantom lines, the test application 427 may enable a test developer to write test code. This test code may be communicated from the logical computing box 402 to the logical computing box 404. As a received packet flows through the receive stack 409, the third protocol software module 432 may provide information to the communication control portion 434 which may, in turn, provide that information to the test application 427 via the serfs 470, 472 as instructed by the test code of the test application 427. Similarly, the second protocol software module 430 and the first protocol software module 428 may also provide information to the communication control portion 434 which may, in turn, provide that information to the test application 427 via the serfs 470, 472. The test application 427 may therefore have access to internal state information of packets as they flow down the receive stack 409 and may also control and modify such internal state information as the packet moves between the protocol software modules 432, 430, 428.

Figure 5:
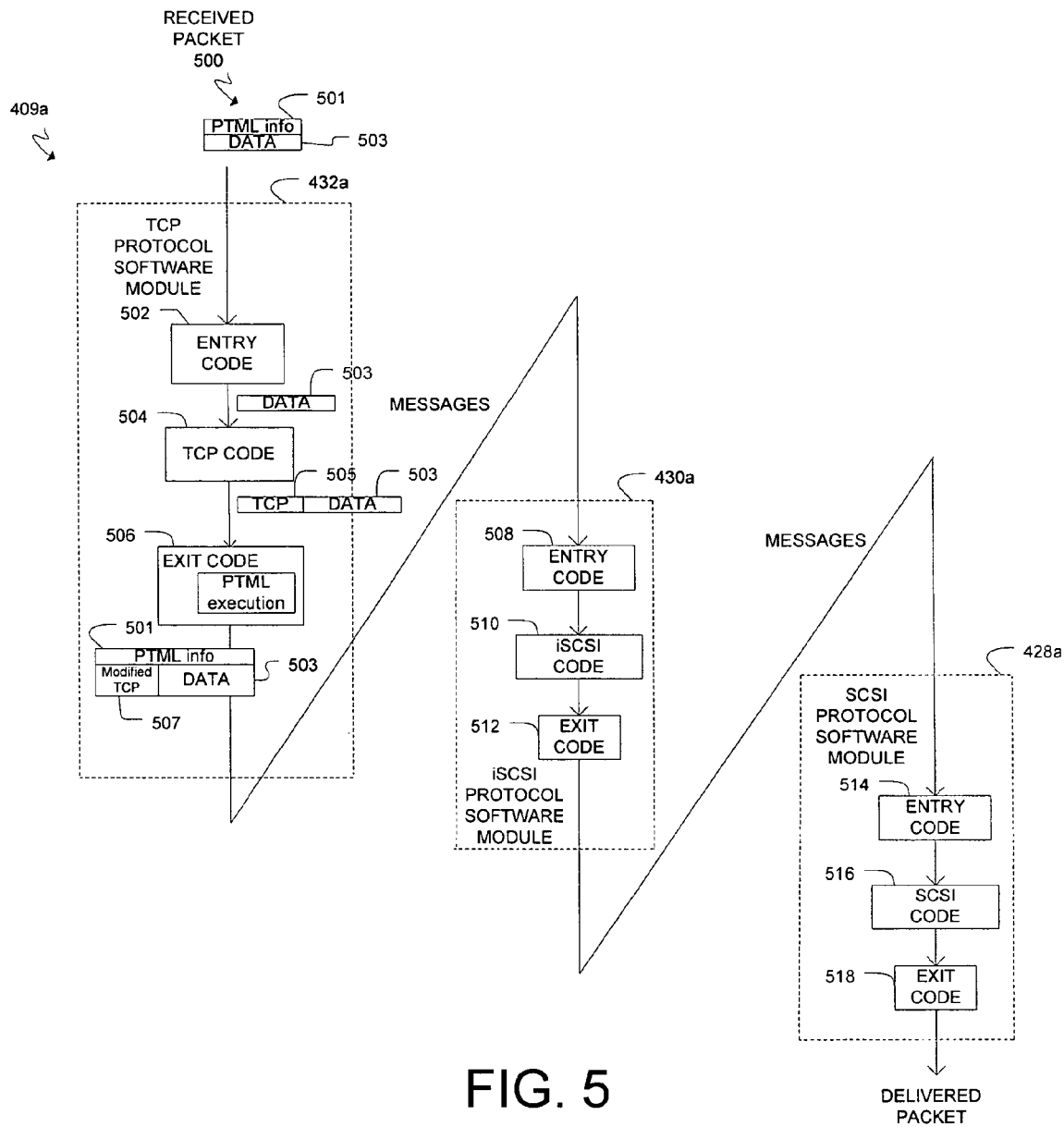
FIG. 5 is a diagram of a receive stack of FIG. 4 in more detail.

FIG. 5 illustrates an exemplary receive stack consistent with the receive stack 409 of FIG. 4 where the third protocol software module 432a is a TCP module, the second protocol software module 430a is an iSCSI module, and the first protocol software module 428a is a SCSI module in order to further detail how the receive stack 409 can present internal state information to the test application 427 and enable the test application 427 to control and modify internal state information of packets. The TCP, iSCSI, and SCSI protocol software modules 432a, 430a, 428a may be chained together to form the receive stack 409a such that the packet output the TCP module 432a is input the iSCSI module 430a and the packet output the iSCSI module 430a is input the SCSI module 428a. The TCP module 432a may include entry code 502, TCP code 504, and exit code 506. The iSCSI module 430a may include entry code 508, iSCSI code 510, and exit code 512, while the SCSI module 428a may include entry code 514, SCSI code 516, and exit code 518.

The entry code may process arriving messages, e.g., from the exit code of the preceding protocol software module in one instance, check for events, and interpret packet time manipulation language (PTML). PTML is a language that allows a test developer to write test code or logic using common "C" language type constructs. The TCP code 504 may provide associated TCP protocol services for normal protocol processing for that particular communication protocol and add TCP control information enabling a service. The exit code 506 may then check for events, interpret PTML code, and generate new messages for the entry code 508 of the next protocol software module 430a. The entry and exit code of each respective protocol software module enables data and information of a packet associated with that particular protocol to be manipulated by the test application 427, 429 utilizing the PTML.

For example, packet 500 may be received at the TCP module 432a. The packet may include PTML information 501 and data 503. The data portion 503 of the packet 500 may be passed by the entry code 502 to the TCP code 504. The PTML information 501 may be registered at the entry code 502 of the TCP module 432a. The registered PTML code may be representative of an action to take in case of a condition. If the condition is met by a future packet, the action may then be taken. The action may include dropping a packet if the condition is met. Further examples are provided in conjunction with FIG. 6. The output of the TCP code 504 may then include TCP data 505 and the data 503. The exit code 506 may execute a PTML expression that may result in modifying internal state information of the TCP data 505 to provide modified TCP data 507 with the data 503 and PTML information 501.

Figure 6:
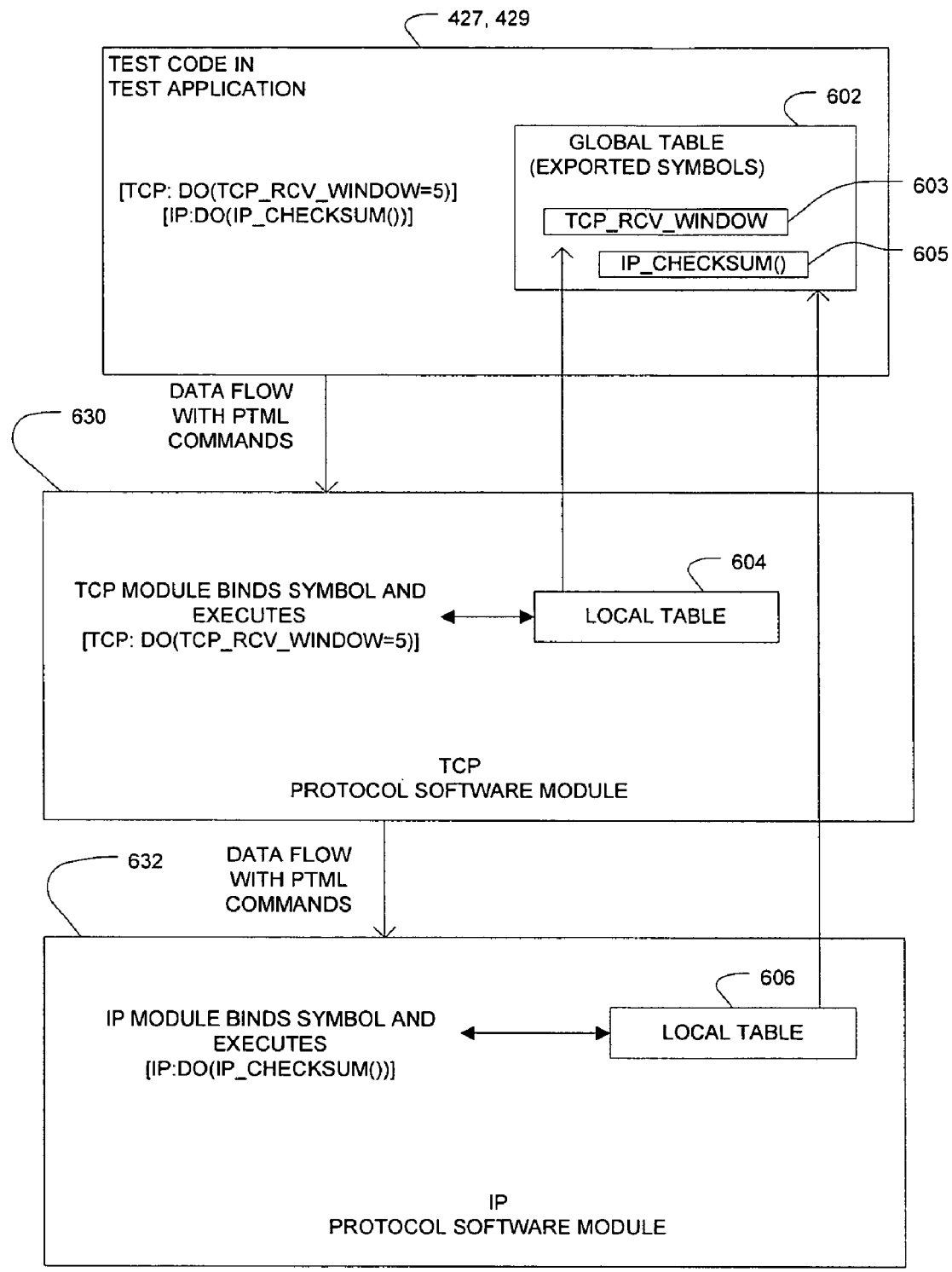
FIG. 6 is diagram illustrating separation of test logic or test code of the test application from the test implementation of protocol software modules.

FIG. 6 illustrates an example of separation of test logic or test code of the test application 427, 429 from test implementation. The test application 427, 429 may be separate from the test implementation as carried out by the protocol software modules 630, 632. The protocol software module 630 may be a TCP module and the protocol software module 632 may be an IP module.

The test logic or code may be written by a test developer utilizing the test application 427, 429. The test logic may be expressed through PTML expressions which may utilize symbols exported by the protocol software modules 630 and 632. The PTML expressions created by the test developer may be parsed and placed into an intermediary form and then passed with in band data messages traveling down the protocol stack. An example of PTML expressions may include [TCP: do(tcp_rcv_window=5)] [IP: do (ip_checksum( ))]. The PTML expressions may enter the implementation space defined by the TCP and IP protocol software modules 630 and 632. The TCP module 630 would ignore all non TCP PTML expressions and pass them down to the next module in the stack. Accordingly, the TCP module 630 would ignore the IP expression and pass it down to the IP module 632.

When the TCP PTML expression reaches the TCP module 630, the entry and exit code about the protocol code in the TCP module 630 would process the PTML statement and perform the operations specified in the statement. Accordingly, the TCP module 630 would execute the TCP: do(tcp_rcv_window=5) PTML expression and may communicate results to the local table 604 local to the TCP module 630 and also to the global table 602. When the IP PTML expression reaches the IP module 632, the entry and exit code about the protocol code of the IP module 632 would process the PTML statement and perform the operations specified by the statement. Accordingly, the IP module 632 may execute the IP: do (ip_checksum( )) PTML expression and communicate results to the local table 606 and global table 602.

The creation of the PTML allows a test developer to write test logic or code using common "C" language type constructs. Some features of PTML include the use of identifiers exported by the protocol software modules such as the "tcp_rcv_window" identifier 603 exported by the TCP module 630 and the "ip_checksum( )" identifier exported by the IP module 632.

Another feature of PTML may include the binding of identifiers to protocol software module test services at the time the message is processed by the particular protocol software module. The time at which a symbol is bound to a value is important. Constants are identifiers that are bound to values at compile time. The value does not change during the execution of the program. PTML code may be written by a user as part of the source code of a program. However, it is not "compiled" until the program is being executed. The constants of a PTML program therefore take on the values they are assigned when the executing program "compiles" the PTML code into the intermediate form. The symbols used in PTML program may not be mapped to actual virtual memory locations at this point in time however (as would be the case in a normal link sequence of a compile/link/load process). The PTML variables may be offsets from a base table. Thus, until the base table has been given a value the offsets are not valid. PTML code "executes" when a packet arrives at a protocol software module. Just before PTML executes, the entry/exit code portion of the protocol software module set the value of the base table pointers such that they reference the correct data tables and especially the location where the packet is in memory. When a PTML symbol is used (such as a field in a packet) it may reference the packet currently being processed by the protocol software module. This is what a user is typically interested in. This process allows the user to write PTML code without knowledge of the details of how some implementation of a protocol code placed the packet. In other words, the writer of the test code may write in almost the same manner as if writing the protocol code itself. This allows test code to be compiled and linked independently of the protocol code.

Another feature of the PTML is the execution of the PTML code by a protocol software module thread. A thread is a stream of program execution that is created by the operating system. The protocol software module thread may function to keep items in sequence. For instance, by causing the PTML code to be executed by the protocol software module thread it relieves the test writer from having to keep things in order between the test application thread and what is taking place in the stack. This helps prevent corruption of the flow of information through the protocol stack that may occur if additional packets are sent up the stack before the PTML code is executed.

PTML expressions may be written as character strings. When characters are encountered by a protocol software module, the module may search a symbol table such as table 602 for the identifier. If the identifier is found, information about the identifier may be acquired from the symbol table 602. This may include the type of symbol and partial address information. A PTML expression may be either associated with a message sent down the protocol stack or registered with a particular protocol software module. In either case, the module may execute the PTML expression when it arrives at the module or for each message that the module processes (for registered PTML expressions). When the PTML expression is executed the state variables in the module have the values that would be seen by the packet passing through the module if there was no PTML expression. The PTML execution may be synchronous with the module operation ensuring that data flow in the protocol stack remains ordered.

A PTML expression that may be registered with a particular protocol software module does not flow down the stack but rather acts like a trigger on all packets that arrive at the particular protocol software module. If the trigger condition is true, then the action is performed. The trigger condition may be removed after a certain number of matches. For example, for an FCP protocol software module where FCP is an implementation of serial Small Computer System Interface (SCSI) for Fibre Channel, a PTML expression may be [FCP: if(P->OX_ID=0xFFFF) drop]. This PTML expression may be registered at the entry code of the FCP protocol software module. Each time an FCP packet arrives, the OX_ID field is checked and if it is 0xFFFF, the packet is dropped. The event may deregister itself once it is triggered or remain active. As another example, a PTML expression for a TCP protocol software module may be [TCP: (If(P->sport==DHCP) drop)]. The "sport" field of a TCP packet may then be checked each time a TCP packet arrives and the TCP packet may be dropped if the condition is met. As yet another example, a PTML expression may be [TCP: (If (tcp_rcv_window<25) drop]. The TCIP packet may then be dropped based on a resource condition within the TCP protocol layer code.

PTML symbols may be maintained in various symbol tables. There may be one global symbol table per logical computing box such as table 602. There may also be one protocol software module table per each protocol software module such as local tables 604, 606. Each protocol software module may export PTML symbols to allow visibility into their operation during plumbing.

Consider an example of testing a wrap condition of a particular communication protocol with a large counter (e.g., 64 bits) and where the communication protocol specifies the counter start at a known initial state (e.g., 0 or 1). Conventional tests would have to transfer sufficient packets to trigger the wrap condition or would have to modify the protocol source code to create the wrap condition. Both situations are undesirable. Such a wrap condition situation may be present for the iWARP protocol specification being defined by the Internet Engineering Task Force (IETF) for remote direct memory access using the Internet Protocol.

Using software consistent with embodiments detailed herein, two IWARP systems representing communication endpoints may each be represented as a logical computing box. The first logical box may be called a "source" and the second logical box may be called a "sink." The iWARP software on both systems may present the counter through a PTML symbol called "counter." Test logic may then be written by a test developer in the following manner.

Create a TCP connection between the two systems.
Register PTML string "source-ptml" on the source logical computing box.
Register PTML string "sink-ptml" on the sink logical computing box.
Send an iWARP message from the source to the sink.
Verify that an error condition (TCP connection closed) is not generated by the sink.

In this example, the PTML string registered on the source logical computing box would be: [DDP: do (PACKET->counter_field=0xFFFFFFFF)], where DDP is the IWARP protocol software module of interest, "PACKET" is a symbol exported by the protocol software module representing the current packet, and "counter_field" is the internal state information of the field of the packet used by the protocol code to exchange the value of the counter. This PTML string would then cause the message being sent by the "source" to have the value 0xFFFFFFFF instead of 0x00000000.

The PTML string registered on the sink logical computing box would be [DDP: if (PACKET->counter_field==0xFFFFFFFF) do (counter=PACKET->counter_field)]. This PTML string would change the internal state information of the sink such that it would not generate an error for the arriving message as the internal state information presented by the counter is set to that of the arriving message before the protocol software module executes. The sink is now in a state where the wrap condition test can be performed.

Figure 7:
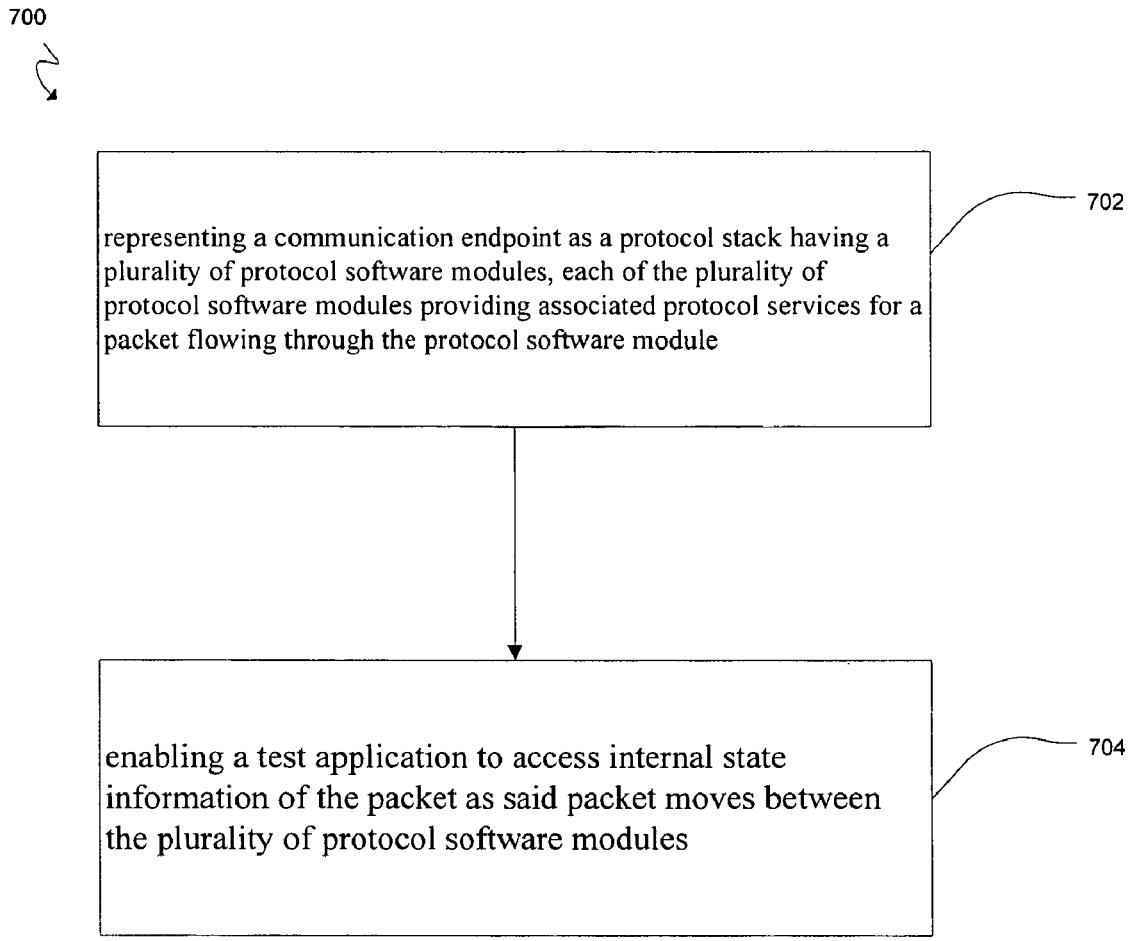
FIG. 7 is a flow chart illustrating operations that may be performed according to an embodiment.

FIG. 7 illustrates a flow chart 700 of operations consistent with an embodiment. Operation 702 may include representing a communication endpoint as a protocol stack having a plurality of protocol software modules, each of the plurality of protocol software modules providing associated protocol services for a packet flowing through the protocol software module. Operation 704 may include enabling a test application to access internal state information of the packet as the packet moves between the plurality of protocol software modules.

In summary, there is provided a computer program product residing on a computer readable medium having a plurality of instructions stored thereon which, when executed by a processor cause the processor to: represent a communication endpoint as a protocol stack having a plurality of protocol software modules, each of the plurality of protocol software modules providing associated protocol services for a packet flowing through the protocol software module; and enable a test application to access internal state information of the packet as the packet moves between the plurality of protocol software modules.

There is also provided a system. The system may include a choreographer workstation configured to communicate with a device under test. The choreographer workstation may include a machine readable medium, a processor, and a computer program product residing on the computer readable medium having a plurality of instruction stored thereon. When executed by the processor the instructions cause the processor to: represent the choreographer workstation as a transmit stack and a receive stack each having a plurality of protocol software modules; represent the device under test as a transmit stack and a receive stack each having a plurality of protocol software modules, each of the plurality of protocol software modules of the transmit stack and the receive stack of the choreographer workstation and the transmit stack and the receive stack of the device under test providing associated protocol services for a packet flowing through the protocol software module; and enable a test application to access internal state information of the packet as the packet moves between the plurality of protocol software modules of the transmit stack and the receive stack of the choreographer workstation and the transmit stack and the receive stack of the device under test.

Advantageously, in these embodiments, internal state information of a packet as it passes between each protocol software module is made available or visible to a test application. The internal state information may represent the view the particular protocol software module sees at the time it is processing a packet flowing through the protocol stack. Test developers then do not have to modify the actual protocol code in order to do internal state testing. The internal state information also provides greater control over the device being tested, and the standardized mechanism allows tests to be reused on different devices. In addition, the test application may be able to control the internal state information as is moves between the protocol software modules. Thus, the test application can create conditions necessary to test a particular aspect of the communication protocol such as the wrap condition. Furthermore, the testing tool may be general enough that organizations do not need to create or adopt new test tools as they move between technologies and communication protocols.

Because the internal state information is described by the protocol software module to the test application, a test developer does not need to write code specific to each particular task to examine or change the value of the state information so a test can be performed. By providing a standardized framework, the state information in the protocol software module can be mapped into symbols that get bound to actual values at the time a packet is being processed by the protocol software module. This allows the test developer to write a symbolic form of the test without having to write code that has internal knowledge of the protocol implementation. The separate test application is able to use internal state information through the PTML to create test code or test logic. Since the test code or logic is now separate from the particular implementation the test logic can be reused to test other software implementations that support the same protocol.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Other modifications, variations, and alternatives are also possible. Accordingly, the claims are intended to cover all such equivalents.

What is claimed is:

1. A method comprising:
  representing, using a processor, a communication endpoint as a protocol stack having a plurality of different protocol software modules, each of said plurality of different protocol software modules configured to implement a different associated protocol providing different associated protocol services for a packet flowing through said protocol software module wherein at least one of said plurality of protocol software modules comprises entry code, protocol code, and exit code;
  enabling, using said processor, a test application to access internal state information of said packet as said packet moves between said plurality of protocol software modules for selecting a configuration of said different protocols in said protocol stack using at least one packet time manipulation language (PTML) expression wherein each at least one PTML expression comprises at least one protocol software module identifier and at least one operation;
  enabling, using said processor, said test application to control said internal state information as said packet moves between said plurality of protocol software modules using said at least one PTML expression; and
  enabling, using said processor, test code to be written and registered with one of said plurality of protocol software modules, said test code comprising said at least one PTML expression, said test code representative of an action to take in case of a condition wherein said action and said condition are included in said at least one PTML expression, said one of said plurality of protocol software modules performing said action if said condition is present in said packet, wherein said test code is configured to be compiled and linked independently of said protocol code,
  wherein said entry code is configured to check for test code from said test application, to set a value of a pointer to a first table and to interpret said at least one PTML expression, said protocol code is configured to provide said associated protocol services, and said exit code is configured to check for test code from said test application, to set a value of a pointer to a second table and to interpret said at least one PTML expression after said protocol code provides said associated protocol services and if said test code applies to said at least one protocol software module, said exit code performing said operation specified by said test code,
  wherein said enabling operation comprises exporting at least one symbol from at least one of said plurality of protocol software modules to at least one of said first table and said second table, said test application utilizing said at least one symbol to access said internal state information using said at least one PTML expression.

2. The method of claim 1, wherein said condition comprises a condition of a field of said packet and said action is dropping said packet.

3. The method of claim 1, wherein said internal state information comprises a counter field representative of a count value of a counter, and said control operation changes said counter field to represent a count value proximate a maximum count value of said counter to test a wrap condition of said counter when said count value reaches said maximum count value and resets to an initial count value.

4. The method of claim 1, wherein said protocol stack comprises a receive stack, said receive stack comprises a third, second, and first protocol software module, and wherein said packet output of said third protocol module is input to said second protocol module, and wherein said packet output of said second protocol module is input to said first protocol module, wherein said third protocol software module comprise a Transmission Control Protocol (TCP) module, said second protocol software module comprises an Internet Small Computer System Interface (iSCSI) module, and said first protocol software module comprises a Small Computer System Interface (SCSI) module.

5. A computer program product residing on a non-transitory computer readable medium having a plurality of instructions stored thereon which, when executed by a processor, cause the processor to:
  represent a communication endpoint as a protocol stack having a plurality of different protocol software modules, each of said plurality of different protocol software modules configured to implement a different associated protocol providing different associated protocol services for a packet flowing through said protocol software module wherein at least one of said plurality of protocol software modules comprises entry code, protocol code, and exit code;
  enabling a test application to access internal state information of said packet as said packet moves between said plurality of protocol software modules for selecting a configuration of said different protocols in said protocol stack using at least one packet time manipulation language (PTML) expression wherein each at least one PTML expression comprises at least one protocol software module identifier and at least one operation;
  enabling said test application to control said internal state information as said packet moves between said plurality of protocol software modules using said at least one PTML expression; and
  enabling test code to be written and registered with one of said plurality of protocol software modules, said test code comprising said at least one PTML expression, said test code representative of an action to take in case of a condition wherein said action and said condition are included in said at least one PTML expression, said one of said plurality of protocol software modules performing said action if said condition is present in said packet, wherein said test code is configured to be compiled and linked independently of said protocol code, wherein said entry code is configured to check for test code from said test application, to set a value of a pointer to a first table and to interpret said at least one PTML expression, said protocol code is configured to provide said associated protocol services, and said exit code is configured to check for test code from said test application, to set a value of a pointer to a second table and to interpret said at least one PTML expression after said protocol code provides said associated protocol services and if said test code applies to said at least one protocol software module, said exit code performing said operation specified by said test code, wherein said enabling operation comprises exporting at least one symbol from at least one of said plurality of protocol software modules to at least one of said first table and said second table, said test application utilizing said at least one symbol to access said internal state information using said at least one PTML expression.

6. The computer program product of claim 5, wherein said condition comprises a condition of a field of said packet and said action is dropping said packet.

7. The computer program product of claim 5, wherein said internal state information comprises a counter field representative of a count value of a counter, and said control operation changes said counter field to represent a count value proximate a maximum count value of said counter to test a wrap condition of said counter when said count value reaches said maximum count value and resets to an initial count value.

8. The computer program product of claim 5, wherein said plurality of protocol software modules comprises a third, second, and first protocol software module, and wherein said packet output of said third protocol module is input to said second protocol module, and wherein said packet output of said second protocol module is input to said first protocol module, wherein said third protocol software module comprise a Transmission Control Protocol (TCP) module, said second protocol software module comprises an Internet Small Computer System Interface (iSCSI) module, and said first protocol software module comprises a Small Computer System Interface (SCSI) module.

9. A system comprising:
a choreographer workstation configured to communicate with a device under test, said choreographer workstation comprising:
a non-transitory computer readable medium;
a processor;
a computer program product residing on said computer readable medium having a plurality of instructions stored thereon, which, when executed by said processor causes said processor to:
represent said choreographer workstation as a transmit stack and a receive stack each having a plurality of different protocol software modules;
represent said device under test as a transmit stack and a receive stack each having a plurality of different protocol software modules, each of said plurality of different protocol software modules of said transmit stack and said receive stack of said choreographer workstation and said transmit stack and said receive stack of said device under test configured to implement a different associated protocol providing different associated protocol services for a packet flowing through said protocol software module wherein at least one of said plurality of protocol software modules comprises entry code, protocol code, and exit code;
enable a test application to access internal state information of said packet as said packet moves between said plurality of protocol software modules of said transmit stack and said receive stack of said choreographer workstation and said transmit stack and said receive stack of said device under test for selecting a configuration of said different protocols in at least one of said transmit stack and said receive stack of said choreographer workstation and said transmit stack and said receive stack of said device under test using at least one packet time manipulation language (PTML) expression wherein each at least one PTML expression comprises at least one protocol software module identifier and at least one operation;
enable said test application to control said internal state information as said packet moves between said plurality of protocol software modules using said at least one PTML expression; and
enable test code to be written and registered with one of said plurality of protocol software modules, said test code comprising said at least one PTML expression, said test code representative of an action to take in case of a condition wherein said action and said condition are included in said at least one PTML expression, said one of said plurality of protocol software modules performing said action if said condition is present in said packet, wherein said test code is configured to be compiled and linked independently of said protocol code,
wherein said entry code is configured to check for test code from said test application, to set a value of a pointer to a first table and to interpret said at least one PTML expression, said protocol code is configured to provide said associated protocol services, and said exit code is configured to check for test code from said test application, to set a value of a pointer to a second table and to interpret said at least one PTML expression after said protocol code provides said associated protocol services and if said test code applies to said at least one protocol software module, said exit code performing said operation specified by said test code,
wherein said enable operation comprises exporting at least one symbol from at least one of said plurality of protocol software modules to at least one of said first table and said second table, said test application utilizing said at least one symbol to access said internal state information using said at least one PTML expression.

10. The system of claim 9, wherein said internal state information comprises a counter field representative of a count value of a counter, and said control operation changes said counter field to represent a count value proximate a maximum count value of said counter to test a wrap condition of said counter when said count value reaches said maximum count value and resets to an initial count value.

* * * * *